United States Patent [19]
Iinuma et al.

[11] Patent Number: 5,201,227
[45] Date of Patent: Apr. 13, 1993

[54] DEVICE FOR MEASURING VIBRATIONS ON ROTATING BLADE

[75] Inventors: Hideyasu Iinuma, Iruma; Takashi Wakatsuki, Tokyo; Nobuya Minagawa, Ome, all of Japan

[73] Assignee: Ishikawajima-Harima Jukogyo Kabushiki Kaisha, Tokyo, Japan

[21] Appl. No.: 846,086

[22] Filed: Mar. 5, 1992

[51] Int. Cl.[5] ............................................. G01D 5/32
[52] U.S. Cl. ....................................... 73/655; 73/660
[58] Field of Search ......................... 73/655, 657, 660; 250/227.11, 227.20

[56] References Cited

U.S. PATENT DOCUMENTS

| | | | |
|---|---|---|---|
| 3,584,509 | 6/1971 | Compton et al. | 374/123 |
| 4,049,349 | 9/1977 | Wennerstrom | 73/117.3 |
| 4,060,329 | 11/1977 | Ellis | 73/655 |
| 4,593,566 | 6/1986 | Ellis | 73/660 |
| 4,648,711 | 3/1987 | Zachary | 374/125 |
| 4,799,751 | 1/1989 | Tekippe | 250/227.28 |
| 4,851,666 | 7/1989 | Anderson et al. | 250/227.11 |
| 4,995,257 | 2/1991 | Leon | 73/660 |

FOREIGN PATENT DOCUMENTS 1353732 5/1974 United Kingdom .

OTHER PUBLICATIONS

Vibration Measurements on Turbomachine Rotor Blades With Optical Probes by H. Roth, pp. 215-224 Preface and Contents.

*Primary Examiner*—Hezron E. Williams
*Assistant Examiner*—Nashmiya Ashraf
*Attorney, Agent, or Firm*—Oblon, Spivak, McClelland, Maier & Neustadt

[57] ABSTRACT

A device for measuring vibrations of a rotating blade of a gas turbine includes an optical probe that is mounted within a casing of the rotating blade. The probe includes a light projecting and a light receiving optical fiber along with associated focusing lenses and a protective glass. In addition, liquid coolant channels are provided within the probe housing and air coolant channels are provided within the blade casing in order to protect the probe from the hostile environment of the turbine.

2 Claims, 4 Drawing Sheets

DEVICE FOR MEASURING VIBRATIONS ON ROTATING BLADE

BACKGROUND OF THE INVENTION

The present invention relates to a device for measuring vibrations on a rotating blade to determine or grasp level of vibrations on a rotating blade during an operation of a gas turbine or the like.

Hitherto, vibrations on a rotating blade of a turbine or the like during its operation have been measured such that signals based on vibrations of a rotating blade are detected with a strain gauge attached to the blade itself, which are transmitted to stationary parts by transmission means such as a slip ring, a rotary transformer and a microtransmitter, thereby displaying or recording the signals.

A strain gauge has, however, an upper limit of its operating temperature at approximately 800° C., so that it cannot be used for measuring vibrations on a rotating blade of a gas turbine or the like whose temperature may reach a level as high as 1,300° C.

Even in a steam turbine or the like where a strain gauge can be used because of the turbine temperature being below the upper limit of the operating temperature of the gauge, installation of the signal transmitting means will require considerable reconstruction of stationary and rotating parts of the turbine and attachment of the strain gauge on the rotating blade will cause changes in aerodynamic and vibration characteristics of the rotating blade, resulting in difficulty in accurate measurement of inherent vibration characteristics of the rotating blade itself.

The present invention was made to overcome the above disadvantages of the prior art and provides an improved device which uses no strain gauge to be attached on the rotating blade and is capable of optically measuring vibrations of a rotating blade operating at a high temperature without causing any change in the vibration characteristics of the blade.

Now, a preferred embodiment of the present invention will be described with reference to the accompanying drawings.

DETAILED DESCRIPTION OF THE PREFERRED EMBODIMENT

Figure 2:
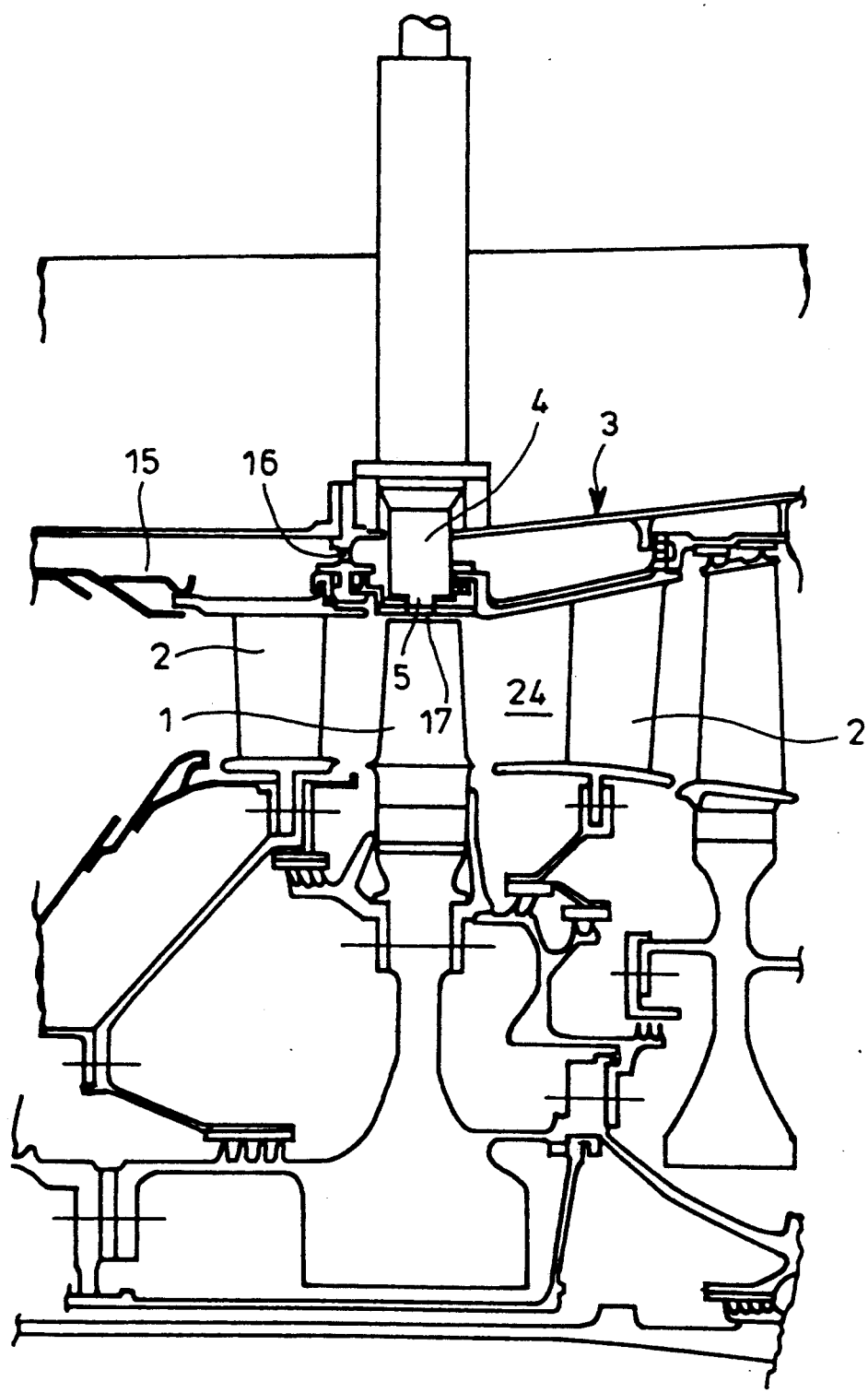
FIG. 2 is a vertical side sectional view of a gas turbine on which the measuring device according to the embodiment of the present invention is attached.

FIG. 2 is a vertical side sectional view of the gas turbine in which reference numeral 1 denotes rotating blades and 2, a stationary nozzle. A casing 3 of the turbine has an outer wall through which extend probes 4 which will be referred to below and each respectively has an inner end 5 oriented toward the tip of the rotating blade 1.

Figure 1:
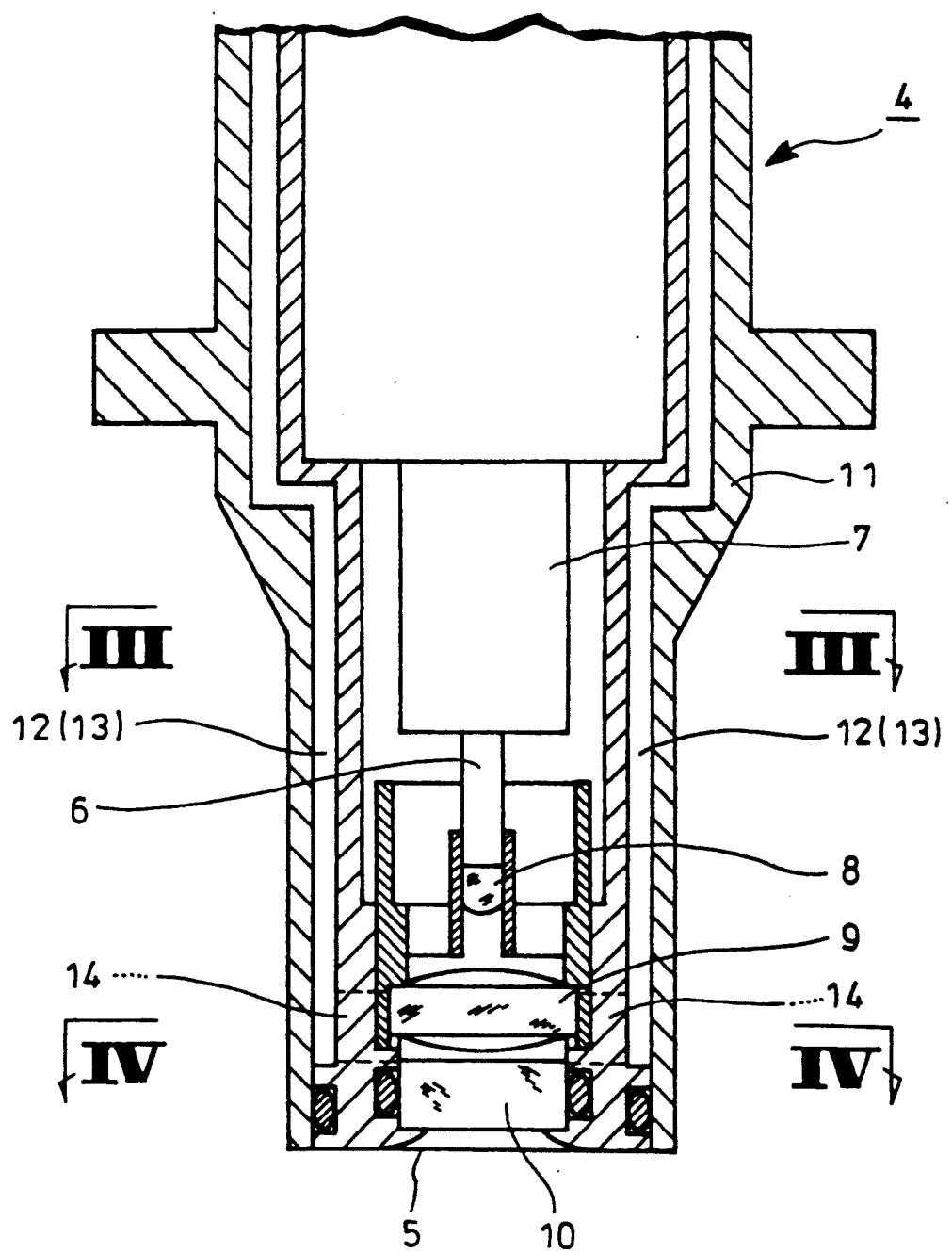
FIG. 1 is an enlarged vertical sectional view of a probe in a preferred embodiment of the present invention.
Figure 3:
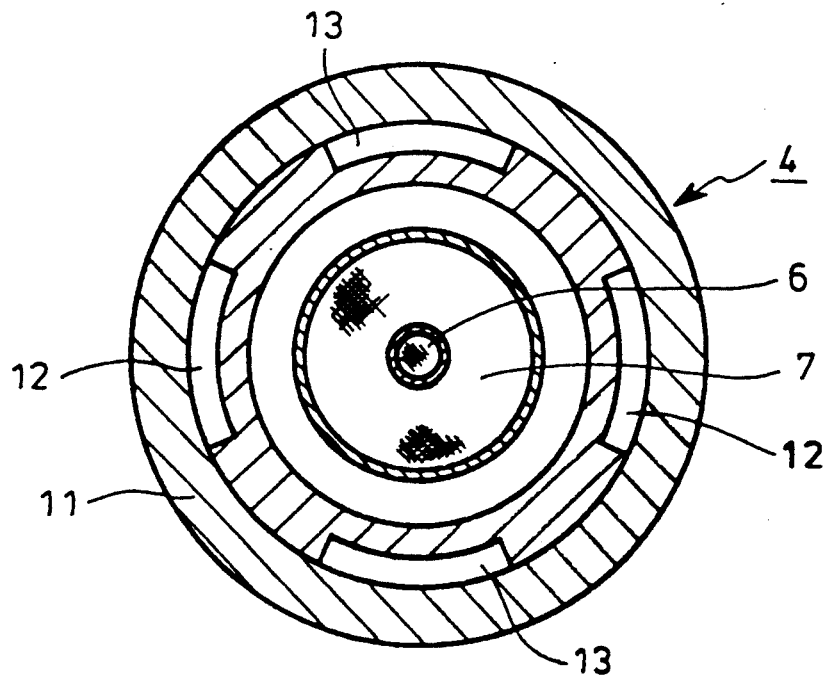
FIG. 3 is a sectional view taken along the line III—III of FIG. 1.

FIG. 1 is an enlarged vertical sectional view of a probe 4 and FIG. 3, a sectional view of the probe taken along the line III—III of FIG. 1. As shown in FIGS. 1 and 3, the probe 4 comprises a light-projecting optical fiber 6 at its center and a light-receiving optical fiber 7 concentrically surrounding the same. The optical fiber 6 has a small-diameter lens 8 made of quartz glass and mounted on a top of the fiber 6. A large-diameter lens 9 made of quartz glass is mounted at some distance ahead of the lens 8 and, at a point farthest ahead of the lens 8, i.e., still farther ahead of the lens 9, a protective glass 10 made of quartz glass is installed. The optical fibers 6 and 7, the lenses 8 and 9 and the protective glass 10 are accommodated in an outer housing 11, thus providing the probe 4.

Figure 4:
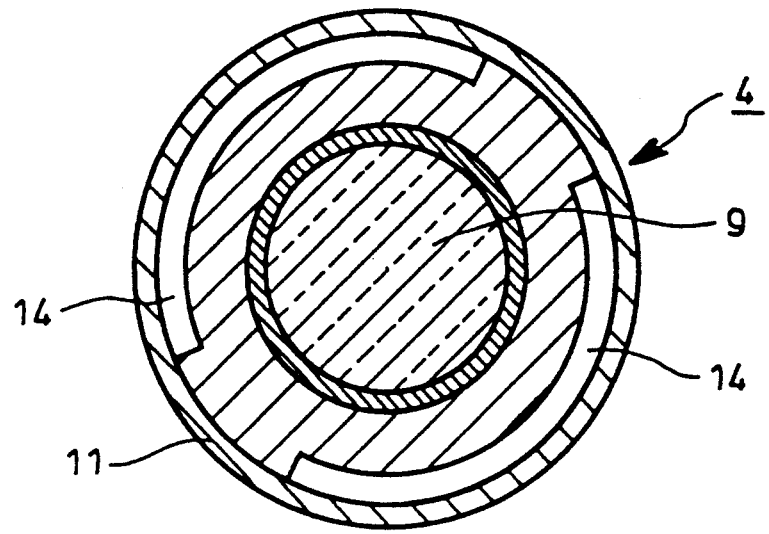
FIG. 4 is a sectional view taken along the line IV—IV of FIG. 1.

Coolant channels 12 and 13 are disposed within the wall housing 11 alternately as shown in FIG. 3 and are intercommunicated at their inner ends through cross channel 14 (see FIGS. 1 and 4), so that the coolant supplied through one coolant channel 12 is passed through the channel 14 and is fedback in reflux through the other coolant channel 13, thus cooling the probe 4.

As shown in FIG. 2, an air channel 15 is located within the wall of the casing 3 of the gas turbine. The gas turbine is provided with a compressor for producing compressed air for combustion of fuel. The compressed air produced in the compressor is partially supplied through the air channel 15 and cools the casing 3, so that some part of the compressed air is passed through a hole 16 and is blown onto the inner end 5 of the probe 4 where it cools the probe 4 and prevents the protective glass 10 from being stained. Then, it is led through a hole 17 into an inside 24 of the gas turbine.

Figure 5:
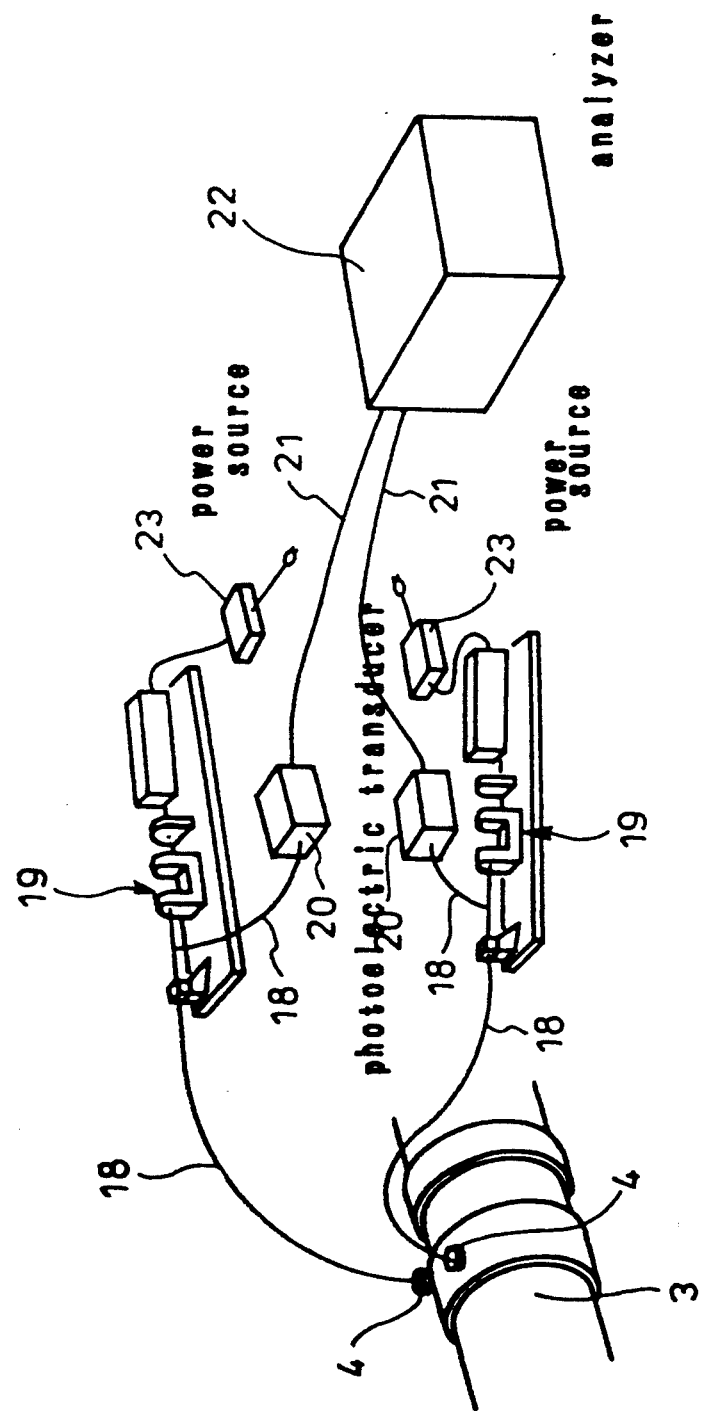
FIG. 5 is a perspective view illustrating the overall construction of the measuring device according to the embodiment of the present invention.

The above-mentioned probes 4 are installed at a plurality of locations on an outer surface of the casing 3 of the gas turbine as shown in FIG. 5. Each probe 4 is connected to a laser lens system 19 through an optical fiber unit 18 comprising the concentrically arranged light-projecting and light-receiving optical fibers 6 and 7 (see FIGS. 1 and 3). The laser lens system 19 is connected through the optical fiber unit 18 to a photoelectric transducer 20 which in turn is connected through a cable 21 to an analyzer 22. Reference numeral 23 in FIG. 5 designates a power source.

Laser beam from the laser lens system 19 is passed through the light-projecting optical fiber 6 in the probe 4, the lenses 8 and 9 and the protective glass 10 (see FIG. 1). Then, it is led from the tip 5 of the probe 4 through the hole 17 as shown in FIG. 2 onto a tip of the rotating blade 1. The laser beam reflected from the tip of the rotating blade 1 is returned through the hole 17, the protective glass 10, the lens 9 into the light-receiving optical fiber 7, so that the laser beam reaches the photoelectric transducer 20 as shown in FIG. 5 where the laser beam is converted into pulsing electrical signals and is fed to the analyzer 22. When the rotating blade 1 is vibrating, a minute deviation will occur in the timing of the reflected pulsing laser beam due to deformation at the tip of the rotating blade 1. Therefore, the level of vibrations on the rotating blade can be measured by analyzing such deviation.

In the measuring operation, the compressed air in the air channel 15 is blown through the hole 16, onto the tip 5 of the probe 4 and through hole 17 into the inside 24 of the gas turbine casings to cool the inner end 5 which is also cooled by the coolant flowing in reflux from one of the coolant channels 12 and 13. The compressed air also serves to prevent the protective glass 10 at the tip 5 of the probe 4 from being stained.

Thus, according to the present invention, with no strain gauge on a rotating blade, vibrations on the rotating blade can be measured so that no change in the vibration characteristics is caused by the measurement. A simple reconstruction of merely mounting probes on a casing can attain the measurement.

The present invention is remarkably advantageous in that it can protect the probes from damage due to high temperature, by means of the lenses and protective glass which are made of highly heat-resistant quartz glass and by means of liquid-cooling with the coolant flowing through the coolant channels within the housing wall of the probe as well as air-cooling with the compressed air blown through the air channel into the inside of the gas turbine casing, enabling the measurement of the level of vibrations on the rotating blade in a higher temperature region of the turbine than has been possible heretofore.

What is claimed is:

1. A device for measuring vibration of a blade rotating within a casing having a wall, comprising a probe having light-projecting and light receiving optical fibers, a lens made of quartz glass on a tip of the light projecting optical fiber, a second lens for directing light to said light receiving optical fiber, a protective glass made of quartz for said lenses, and an outer housing accommodating said lenses, optical fibers and protective glass, said housing being mounted on and extending through an outer surface of the wall of said casing for the rotating blade such that an inner end of said probe is directed towards a tip of said rotating blade to project a beam onto, said blade tip and receive reflections from said blade tip; means connected to said light receiving optical fiber for measuring deviations in said reflected beam due to vibration of said rotating blade; channels for liquid coolant within said housing of said probe and through which liquid is fed back in reflux to cool said probe; and an air channel for compressed air extending through said casing for the rotating blade to the interior thereof, the inner end of said probe communicating with said air channel for further cooling as said compressed air flows from said air channel onto said inner end and into said casing.

2. The device according to claim 1 wherein the light-projecting and light-receiving optical fibers are arranged concentrically.

* * * * *